United States Patent [19]

Tsujido et al.

[11] Patent Number: 5,471,565
[45] Date of Patent: Nov. 28, 1995

[54] METHOD OF DISPLAYING A ROTARY BODY

[75] Inventors: Yoshinori Tsujido; Eriko Tayaoka, both of Amagasaki, Japan

[73] Assignee: Mitsubishi Denki Kabushiki Kaisha, Tokyo, Japan

[21] Appl. No.: 302,385

[22] Filed: Sep. 8, 1994

Related U.S. Application Data

[63] Continuation of Ser. No. 698,984, May 13, 1991, abandoned.

[30] Foreign Application Priority Data

May 14, 1990 [JP] Japan ................................. 2-125145
Nov. 2, 1990 [JP] Japan ................................. 2-298703

[51] Int. Cl.⁶ ................................................. G06T 15/50
[52] U.S. Cl. ................................................. 395/126; 395/119
[58] Field of Search ................................. 395/119, 121, 395/120, 126, 127

[56] References Cited

U.S. PATENT DOCUMENTS

| | | | |
|---|---|---|---|
| 4,866,637 | 9/1989 | Gonzalez-Lopez et al. | 395/126 |
| 4,888,583 | 12/1989 | Ligocki et al. | 395/121 X |
| 4,901,252 | 2/1990 | Fitzgerald et al. | 395/121 |
| 5,072,413 | 12/1991 | Seki et al. | 395/127 |

FOREIGN PATENT DOCUMENTS 60-101608  6/1985  Japan.
2125146  5/1990  Japan.

OTHER PUBLICATIONS

Dr.-Ing. Grätz: "Konzeption eines komplexen 3D–Modells mit beliebiger Flächenstruktur" in Zeitschrift für wirtschaftliche Fertigung, 1983, 12, Seiten 564 bis 571.
Mortenson, "Geometric Modeling", John Wiley & Snos, Inc., 1985, pp. 431–481.
Dassler, Germer: "Geometrisches Modellieren und seine Weiterentwicklung" in Zeitschrift für wirtschaftliche Fertigung, 1985, 5, Seiten 2 bis 207.

*Primary Examiner*—Mark K. Zimmerman
*Attorney, Agent, or Firm*—Rothwell, Figg, Ernst & Kurz

[57] ABSTRACT

A method of displaying on a graphic display a representation of a rotary body to be machined according to a machining program, the rotary body having a rotation axis about which the body rotates, in which an external cross-sectional shape of the body in a plane of the rotation axis is displayed in accordance with stored point data representing an external, closed line denoting the cross-sectional shape. Projected surfaces of the body and recessed surfaces of the body along the external line are represented by predetermined shading data dependent on the location of the respective surfaces with respect to the rotation axis and intervening surface lines.

3 Claims, 3 Drawing Sheets

FIG. 3
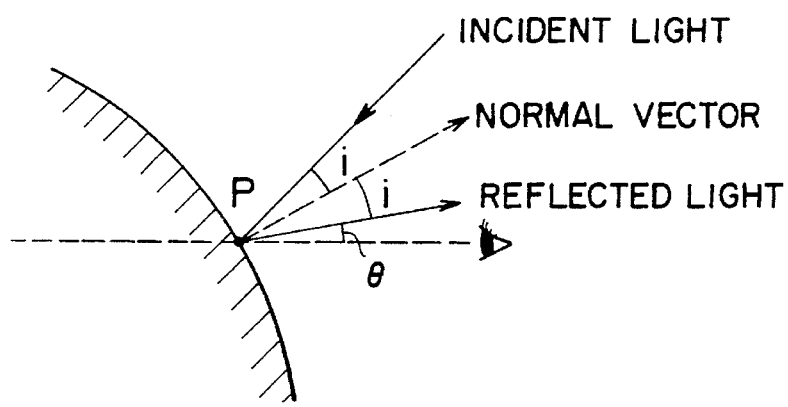
FIG. 4
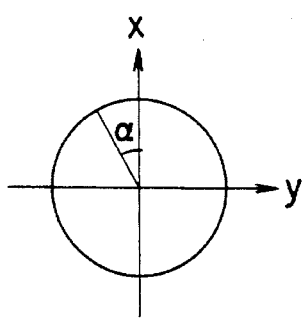
FIG. 5
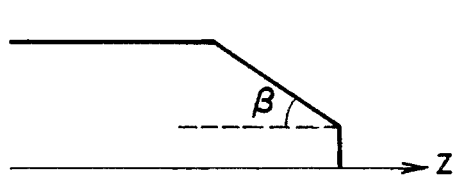
FIG. 6
| cosα \ cosβ | 1.0 | 0.9 | 0.8 | 0.7 | 0.6 | ··· | -1.0 |
|---|---|---|---|---|---|---|---|
| 1.0 | 162 | 77 | 93 | 103 | 113 | ··· | 104 |
| 0.9 | 161 | 76 | 91 | 101 | | ··· | 104 |
| 0.8 | 160 | 73 | 86 | | | | |
| 0.7 | 158 | 70 | | | | | |
| ⋮ | ⋮ | ⋮ | | | | | |
| -1.0 | 104 | 63 | | | | | 162 |

METHOD OF DISPLAYING A ROTARY BODY

This is a continuation of application Ser. No. 07/698,984, filed May 13, 1991, now abandoned.

BACKGROUND OF THE INVENTION

1. Field of the Invention

The present invention relates to a method of displaying a rotary body which is machined by a lathe or the like on a graphic display.

2. Description of the Related Art

Up until now, in a NC (Numerical Control) lathe apparatus, an apparatus for preparing machining programs for NC lathes, or the like, a method of graphically displaying a cross section of a rotary body 10 including a rotation axis 1 which is to be machined, has been commonly used, as shown in FIG. 8. The use of this graphic display enables a machining program and a machined state of a workpiece object to be confirmed.

This above confirmation is a requirement for smoothly performing a series of machining sequences in a NC machine tool, such as inputting machining programs, confirming a program, confirming actual machining and a machined state. This display method is, for example, disclosed in Japanese Patent Laid-Open No. 60-101608 (a numerically controlled apparatus).

However, in the above-mentioned conventional method, since only a cross section of the rotary body is displayed, an operator needs to recognize an actual three-dimensional rotary body based on the shape of a cross section thereof. Therefore, in order to recognize a machined shape three-dimensionally, it is necessary to have experience in this field. It is thus difficult for a novice in this field to recognize the machined shape.

Also, since the state of projected surfaces and recessed surfaces is not displayed in a cross-section display, it is difficult to express the case where a key groove or the like is additionally machined on a projected or recessed surface.

SUMMARY OF THE INVENTION

The present invention has been devised to solve the above-mentioned problems. An object of the present invention is to provide a method of graphically displaying a rotary body which is capable of recognizing a rotary body three-dimensionally and intuitively and of displaying an additionally machined state of an operation performed on a projected surface and on a recessed surface.

A method of the present invention of graphically displaying a rotary body is a method in which a rotary body is projected and displayed from a direction perpendicular to a rotation axis, and comprises the steps of, seen radially from the rotation axis with respect to the external line of a cross section which is projected: displaying the state of a projected surface from the rotation axis to a first projected surface; displaying the state of a recessed surface from the rotation axis to a first recessed surface; displaying the state of the recessed surface from the projected surface to the next recessed surface; and displaying the state of the projected surface from the recessed surface to the next projected surface.

BRIEF DESCRIPTION OF THE DRAWINGS

FIGS. 3 to 5 are each a conceptual view showing a shading technique used in the embodiment;

FIG. 6 shows a brightness table;

DESCRIPTION OF THE PREFERRED EMBODIMENTS

An embodiment of the present invention will be explained hereibelow with reference to the accompanying drawings.

Figure 2:
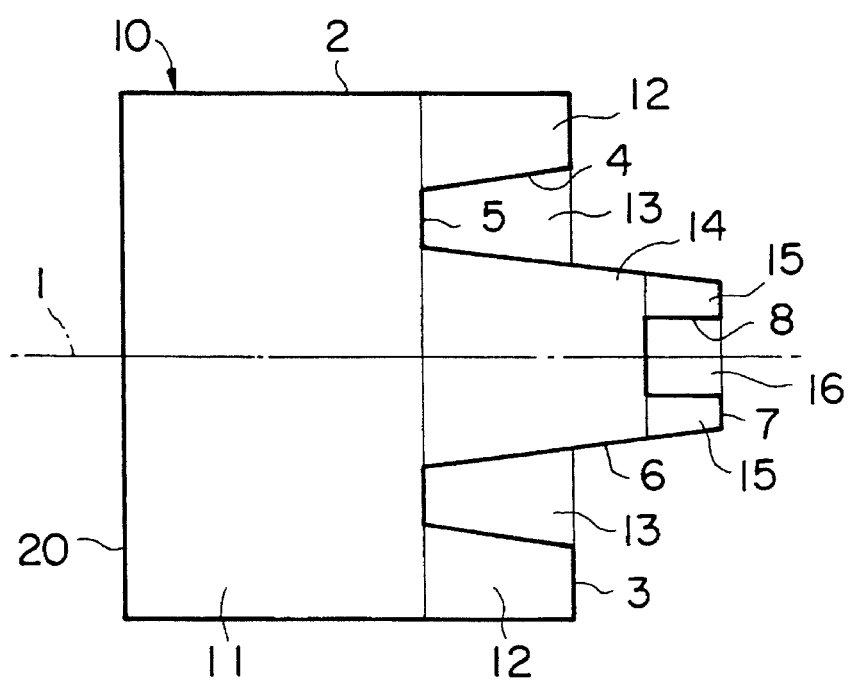
FIG. 2 is a view showing the external line of a cross section of the rotary body of FIG. 1.

With reference to FIG. 2, first a rotary body 10 having a rotation axis 1 will be considered. This rotary body 10 has substantially the shape of a cylinder including a projected surface 2, and a recessed section 13 is formed on one end surface 3 of the cylinder. The recessed section 13 has a side wall surface formed of a recessed surface 4 and a flat bottom surface 5. Formed on the bottom surface 5 of the recessed section 13 is a truncated cone which includes a side wall surface formed of a projected surface 6 and a flat top face 7. A recessed section 16, having a recessed surface 8 as a side-wall surface, is formed on the top face 7 of the truncated cone. In the figure, a thick line 20 indicates the external line of the cross section of the rotary body 10.

In the present invention, the rotary body 10 is projected and displayed from a direction perpendicular to the rotation axis 1. Seen radially from the rotation axis 1 with respect to the external line 20 of the cross section which is projected, the nature of each of the corresponding projected surfaces 2 and 6 are represented in the areas 11 and 14, respectively, by shading from the rotation axis 1 to the projected surfaces 2 and 6. On the other hand, the nature of the corresponding recessed surface 8 is represented in the area 16 by shading from the rotation axis 1 to the first recessed surface 8. Similarly, the nature of the corresponding recessed surface 4 is represented in the area 13 by shading from the projected surface 6 to the next recessed surface 4; the state of each of the corresponding projected surfaces 2 and 6 is represented in the areas 12 and 15, respectively, by shading from the recessed surfaces 4 and 8 to the next projected surfaces 2 and 6.

Figure 1:
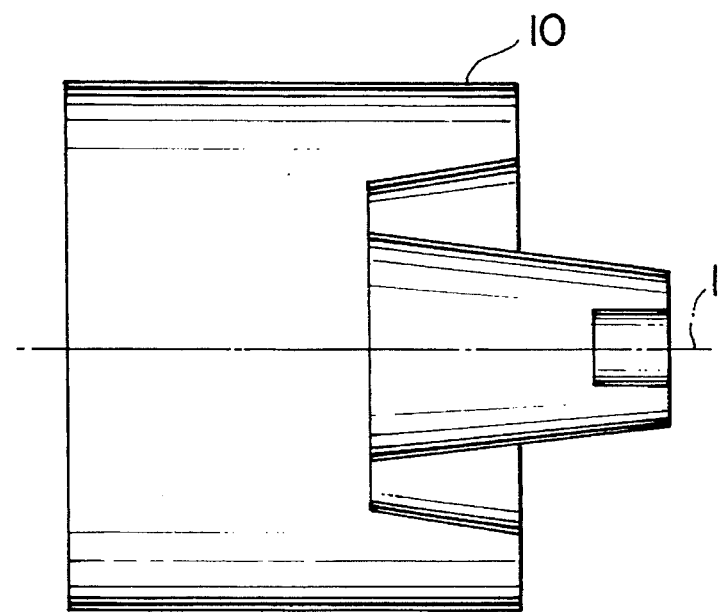
FIG. 1 is a view showing a rotary body which is displayed by a graphic display method of an embodiment of the present invention.

Each respective state of the surfaces 2 and 6 and the surfaces 4 and 8, i.e., whether a projected surface or a recessed surface can be shown, for example, by shading in which the scattering or reflection of light on respective surfaces are taken into consideration. In this way, a realistic picture image shown in FIG. 1 can be obtained. This picture image permits the shape of a three-dimensional rotary body to be intuitively recognized.

A shading picture image can be efficiently obtained by the use of a method which is disclosed, for example, in Japanese Patent Application No. 2-125146. This method will be described below.

According to a reference book, "Interactive Computer Graphics" (McGraw-Hill Kogakusha, Ltd.), the energy E of light which enters eyes from a point P on an object having a reflection factor R and a mirror-surface reflection factor W by means of the light of energy I which enters at an incident angle i as shown in FIG. 3, can be expressed by the following equation if an angle between reflected light and one's line of vision is denoted as $\theta$ and a component for adjusting brightness as n:

$$E = [R\cos i + W(\cos\theta)^n] \cdot I \quad (1)$$

At this point, if it is assumed that the line of vision is a vector perpendicular to the rotation axis from an infinitely distant point and an illumination light beam is a parallel light beam from an infinitely distant point and perpendicular to the rotation axis, the brightness of each point on the surface of an object can be determined from the inclination of the external line and the angle with respect to one's line of vision. The angle with respect to one's line of vision is expressed by a height in a direction perpendicular to the radius.

That is, if one's line of vision is denoted by (0,1,0), an illumination light beam by (a,b,0), an angle for indicating the height in a direction perpendicular to the radius as $\alpha$, as shown in FIG. 4, and the inclination of the external line of a cross-section shape, including the rotation axis (z), as $\beta$, as shown in FIG. 5, then the above equation (1) becomes the following:

$$E = [R\cos\beta(b\sin\alpha - a\cos\alpha) + W\{-b + 2\sin\alpha\cos^2\beta(b\sin\alpha - a\cos\alpha)\}^n] \cdot I \quad (2)$$

Therefore, a brightness table concerning the inclination of the external line and the height with respect to the radius can be prepared from this equation (2). FIG. 6 shows an example of a brightness table prepared in this manner.

The shape of a rotary body is stored as sequence-of-point data of an external line by using the above-mentioned angles $\alpha$ and $\beta$. Shading drawing data of the rotary body is prepared by using a brightness table, and displayed on a graphic display. Thus, a shading picture image can be easily obtained.

In the display method of this embodiment, if only a portion of a projected surface is displayed, its shape indicates a cross section which passes through the rotation axis 1. Therefore, the present embodiment can be used as the conventional display method.

Figure 7:
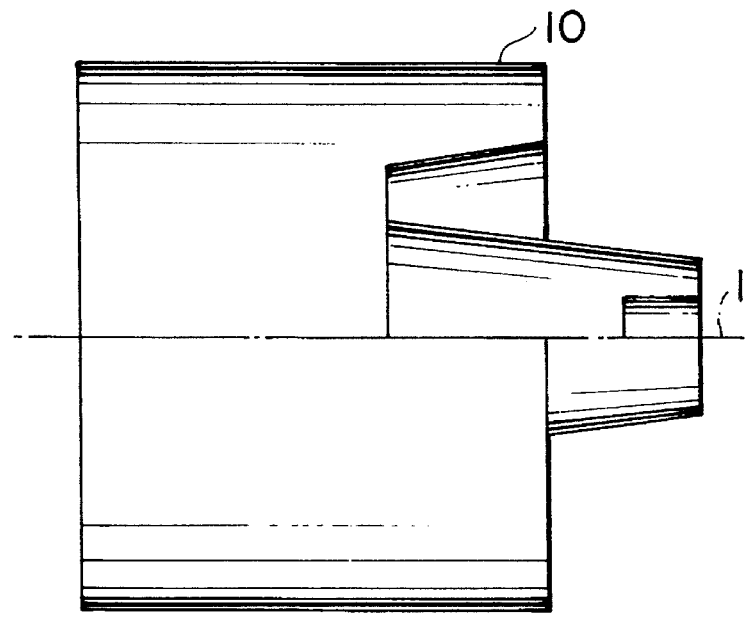
FIG. 7 is a view showing a rotary body which is displayed by a graphic display method of another embodiment of the present invention.
Figure 8:
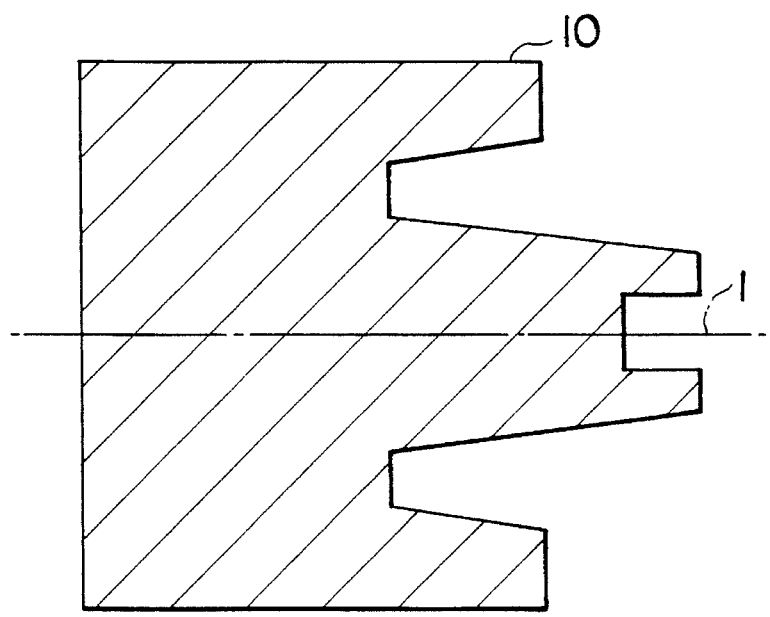
FIG. 8 is a view showing a rotary body which is displayed by a conventional method.

As shown in FIG. 7, a figure is divided into two portions by the rotation axis 1. Only one of them can be displayed by the above-mentioned embodiment. In the other portion, only the state of the projected surfaces 2 and 6 thereof can be displayed. In the above way, it becomes possible for a three-dimensional rotary body to look as if it was an actual cut model.

In addition, according to the present invention, since the state of a projected surface and that of a recessed surface can be displayed, the machined state of an operation performed on each of these surfaces, for example, information on a key groove, surface roughness or the like, can be added.

What is claimed is:

1. A method of displaying on a graphic display a representation of a rotary body to be machined according to a machining program, said rotary body having a rotation axis about which said body rotates and data representing the three-dimensional shape of said body including point data representing a cross-sectional shape of said body being stored in a means accessible to said graphic display, comprising the steps of:

displaying on said display an external cross-sectional shape of said body in a plane of said rotation axis in accordance with stored point data representing an external, closed line denoting said cross-sectional shape, said external line including segments representing boundaries of projected surfaces of said body with respect to said plane and segments representing boundaries of recessed surfaces with respect to said plane as viewed on said display;

shading a first projected surface of said body in an area between said rotation axis and a segment of said external line representing a boundary of said first projected surface by inserting shading data in said area from said rotation axis to said segment representing the state of said first projected surface;

shading a second projected surface of said body in an area between a segment of said external line representing a boundary of said second projected surface and a segment of said external line representing a boundary of a first recessed surface by inserting shading data in said area from said segment representing said first recessed surface to said segment representing said second projected surface;

shading a second recessed surface of said body in an area between said rotation axis and a segment of said external line representing a boundary of said second recessed surface by inserting shading data in said area from said rotation axis to said segment representing a boundary of said second recessed surface; and shading said first recessed surface of said body in an area between a segment of said external line representing a boundary of said first recessed surface and a segment of said external line representing a boundary of said first projected surface by inserting shading data in said area from said segment representing a boundary of said first projected surface to said segment representing a boundary of said first recessed surface.

2. A method of displaying on a graphic display a representation of a rotary body according to claim 1, further comprising the step of dividing said representation of said rotary body into two portions, one portion above said rotation axis and the other portion below said rotation axis, and displaying only projected surfaces of said rotary body in one of said two portions.

3. A method of displaying on a graphic display a representation of a rotary body according to claim 1, wherein said projected and recessed surfaces of said displayed representation of said rotary body denote a machined state of said rotary body according to a programmed machining operation.

* * * * *